United States Patent
Srivastava et al.

(10) Patent No.: US 11,886,223 B2
(45) Date of Patent: Jan. 30, 2024

(54) LEVERAGING HARDWARE-BASED ATTESTATION TO GRANT WORKLOADS ACCESS TO CONFIDENTIAL DATA

(71) Applicant: VMware LLC, Palo Alto, CA (US)

(72) Inventors: Abhishek Srivastava, Sunnyvale, CA (US); David Dunn, Sammamish, WA (US); Jesse Pool, Ottawa (CA); Adrian Drzewiecki, Cupertino, CA (US)

(73) Assignee: VMware LLC, Palo Alto, CA (US)

( * ) Notice: Subject to any disclaimer, the term of this patent is extended or adjusted under 35 U.S.C. 154(b) by 545 days.

(21) Appl. No.: 17/118,978

(22) Filed: Dec. 11, 2020

(65) Prior Publication Data
US 2022/0191025 A1 Jun. 16, 2022

(51) Int. Cl.
| | |
|---|---|
| G06F 9/455 | (2018.01) |
| H04L 9/32 | (2006.01) |
| H04L 9/08 | (2006.01) |
| G06F 21/62 | (2013.01) |
| G06F 21/64 | (2013.01) |
| G06F 21/33 | (2013.01) |

(52) U.S. Cl.
CPC .......... *G06F 9/45558* (2013.01); *G06F 21/62* (2013.01); *G06F 21/6245* (2013.01); *H04L 9/0819* (2013.01); *H04L 9/321* (2013.01); *H04L 9/3268* (2013.01); *G06F 21/33* (2013.01); *G06F 21/64* (2013.01); *G06F 2009/45579* (2013.01); *G06F 2009/45587* (2013.01); *H04L 9/3247* (2013.01)

(58) Field of Classification Search
None
See application file for complete search history.

(56) References Cited

U.S. PATENT DOCUMENTS

| | | |
|---|---|---|
| 2018/0262344 A1 | 9/2018 | Broumas |
| 2019/0036682 A1 | 1/2019 | Qiu |

OTHER PUBLICATIONS

Garfinkel et al., "Terra: A Virtual Machine-Based Platform for Trusted Computing", Oct. 2003, ACM, pp. 193-206. (Year: 2003).*
Szefer et al., "Architectural Support for Hypervisor-Secure Virtualization", Mar. 2012, ACM, pp. 437-449. (Year: 2012).*
"GDPR Fines and Penalties." https://www.gdpreu.org/compliance/fines-and-penalties/2020. Accessed: Jan. 27, 2020.

(Continued)

*Primary Examiner* — Qing Yuan Wu
(74) *Attorney, Agent, or Firm* — Quarles & Brady LLP (57) ABSTRACT

In one set of embodiments, confidential data needed by a workload component running within a worker VM can be placed on an encrypted virtual disk that is attached to the worker VM and hardware-based attestation can be used to validate the worker VM's software and isolate its guest memory from its hypervisor. Upon successful completion of this attestation process, a data decryption key can be delivered to the worker VM via a secure channel established via the attestation, such that the hypervisor cannot read or alter the key. The worker VM can then decrypt the contents of the encrypted virtual disk using the data decryption key, thereby granting the workload component access to the confidential data.

21 Claims, 8 Drawing Sheets

(56) References Cited

OTHER PUBLICATIONS

"Data breaches increased 54% in 2019 so far." https://www.techrepublic.com/article/data-breaches-increased-54-in-2019-so-far/ 2020. Accessed: Jan. 27, 2020.

Davey Winder. "Data Breaches Expose 4.1 Billion Records In First Six Months of 2019". https://www.forbes.com/sites/daveywinder/2019/08/20/data-breaches-expose-41-billion-records-in-first-six-months-of-2019/2020. Accessed: Jan. 27, 2020.

"Kubernetes: Production-Grade Container Orchestration." https://kubernetes.io/2020. Accessed: Jan. 27, 2020.

D. Kaplan, J. Powell, and T. Woller, "Unified Extensible Firmware Interface Specification." https://uefi.org/sites/default/files/resources/UEFI%20Spec%202_6.pdf, 2016. Chapter 30.

"TPM 2.0 Library Specification." https://trustedcomputinggroup.org/resource/tpm-library-specification/2016. Revision: 01.38.

"TCG Trusted Attestation Protocol (TAP) Information Model for TPM Families 1.2 and 2.0 and DICE Family 1.0." https://trustedcomputinggroup.org/wp-content/uploads/TNC_TAP_Information_Model_v1.00_r0.36-FINAL.pdf, 2019. Revision: 0.36.

D. Kaplan, J. Powell, and T. Woller, "AMD Memory Encryption." http://amd-dev.wpengine.netdna-cdn.com/wordpress/media/2013/12/AMD_Memory_Encryption_Whitepaper_v7-Public.pdf, 2016.

"Secure Encrypted Virtualization API." https://developer.amd.com/wp-content/resources/55766.PDF, 2019. Revision: 3.22.

R. Buhren, C. Werling, and J.-P. Seifert, "Insecure Until Proven Up-dated: Analyzing AMD SEV's Remote Attestation," 2019.

"Dm-verity." https://lwn.net/Articles/459420/2011, Sep. 19, 2011.

"Dm-crypt." https://en.wikipedia.org/wiki/Dm-crypt, 2015. Accessed: Jan. 28, 2020.

* cited by examiner

LEVERAGING HARDWARE-BASED ATTESTATION TO GRANT WORKLOADS ACCESS TO CONFIDENTIAL DATA

CROSS-REFERENCES TO RELATED APPLICATIONS

The present application is related to commonly owned U.S. patent application Ser. No. 17/119,068, filed concurrently herewith, entitled "Secure End-to-End Deployment of Workloads in a Virtualized Environment Using Hardware-Based Attestation." The entire contents of this related application are incorporated herein by reference for all purposes.

BACKGROUND

Unless otherwise indicated, the subject matter described in this section is not prior art to the claims of the present application and is not admitted as being prior art by inclusion in this section.

Workload orchestration platforms such as Kubernetes automate the deployment, management, and scaling of workloads (i.e., software applications) across clusters of computing nodes. In these platforms, a workload is composed of a set of execution groups (e.g., "pods" in Kubernetes), where each execution group represents an instance or portion of the workload that can be scheduled and run as an atomic unit on a computing node. An execution group is composed of one or more workload components (e.g., "containers" in Kubernetes), where each workload component represents an executable process of the workload.

A workload orchestration platform can be implemented in a bare metal environment (i.e., a computing environment comprising non-virtualized servers) or a virtualized environment (i.e., a computing environment comprising host systems running hypervisors and virtual machines (VMs)). In the former case the platform's computing nodes are physical machines and in the latter case the platform's computing nodes are VMs. For large-scale and/or business-critical deployments, the use of a virtualized environment is often preferable over a bare metal environment due to certain advantages in platform management and operation such as enhanced scalability, easier automation, dynamic resource allocation, and so on.

However, one issue with implementing a workload orchestration platform in a virtualized environment is that the hypervisors on which the platform's VMs run are privileged and thus have access to the guest memories of those VMs, which may contain platform control plane code or confidential workload data. If a malicious entity is able to take control of these hypervisors by, e.g., exploiting a hypervisor vulnerability or leveraging insider access, the malicious entity could tamper with workloads and/or snoop their confidential data, resulting in a breakdown of the security of the platform.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to techniques for securing workloads that are deployed and run by a workload orchestration platform in a virtualized environment via hardware-based attestation. As used herein, "hardware-based attestation" (or "attestation" for short) is a process—enabled by a hardware processing component known as a platform security processor (PSP)—that is executed with respect to a VM and, if completed successfully, guarantees that (a) the VM is instantiated/initialized with the correct software expected by its owner, and (b) the VM's guest memory cannot be read or altered by a hypervisor during the VM's runtime (or in other words, the guest memory is isolated from the hypervisor). Existing technologies that can be leveraged to implement this attestation process include AMD Secure Encrypted Virtualization (SEV) and Intel Trust Domain Extensions (TDX).

In one set of embodiments, a framework is provided that employs hardware-based attestation to assign a digital certificate to each VM-based control plane element and computing node (i.e., worker VM) of the workload orchestration platform, where the digital certificate is signed by a trusted entity and provides cryptographic proof that the control plane element/worker VM has been successfully attested by that trusted entity (and thus is correct and secure in accordance with attestation guarantees (a) and (b) noted above). Each control plane element/worker VM is configured to verify the digital certificates of other platform components prior to communicating with those components.

With these digital certificates in place, when an end-user such as an application developer submits to the platform's front-end control plane element (referred to herein as the cluster master VM) a new workload for deployment, the end-user can simply verify the digital certificate of the cluster master VM in order to be assured that the workload will be deployed and executed by the platform in a secure manner (i.e., in a manner that prevents tampering by a compromised or rogue hypervisor). This is because the assigned digital certificates establish a chain of trust between the various platform components involved in the end-to-end deployment process, and thus verification of the cluster master VM's digital certificate is sufficient to guarantee the integrity and security of each downstream component in that process.

In a further set of embodiments, for scenarios in which a workload component running within a worker VM requires access to confidential data, the confidential data can be placed on an encrypted virtual disk that is attached to the worker VM and hardware-based attestation can be used to validate the worker VM's software and isolate its guest memory from its hypervisor. Upon successful completion of this attestation process, a data decryption key can be delivered to the worker VM via a secure channel established via the attestation, such that the hypervisor cannot read or alter the key. The worker VM can then decrypt the contents of the encrypted virtual disk using the data decryption key, thereby granting the workload component access to the confidential data.

The foregoing and other aspects of the present disclosure are described in further detail in the sections that follow.

2. Example Environment and Solution Architecture

Figure 1:
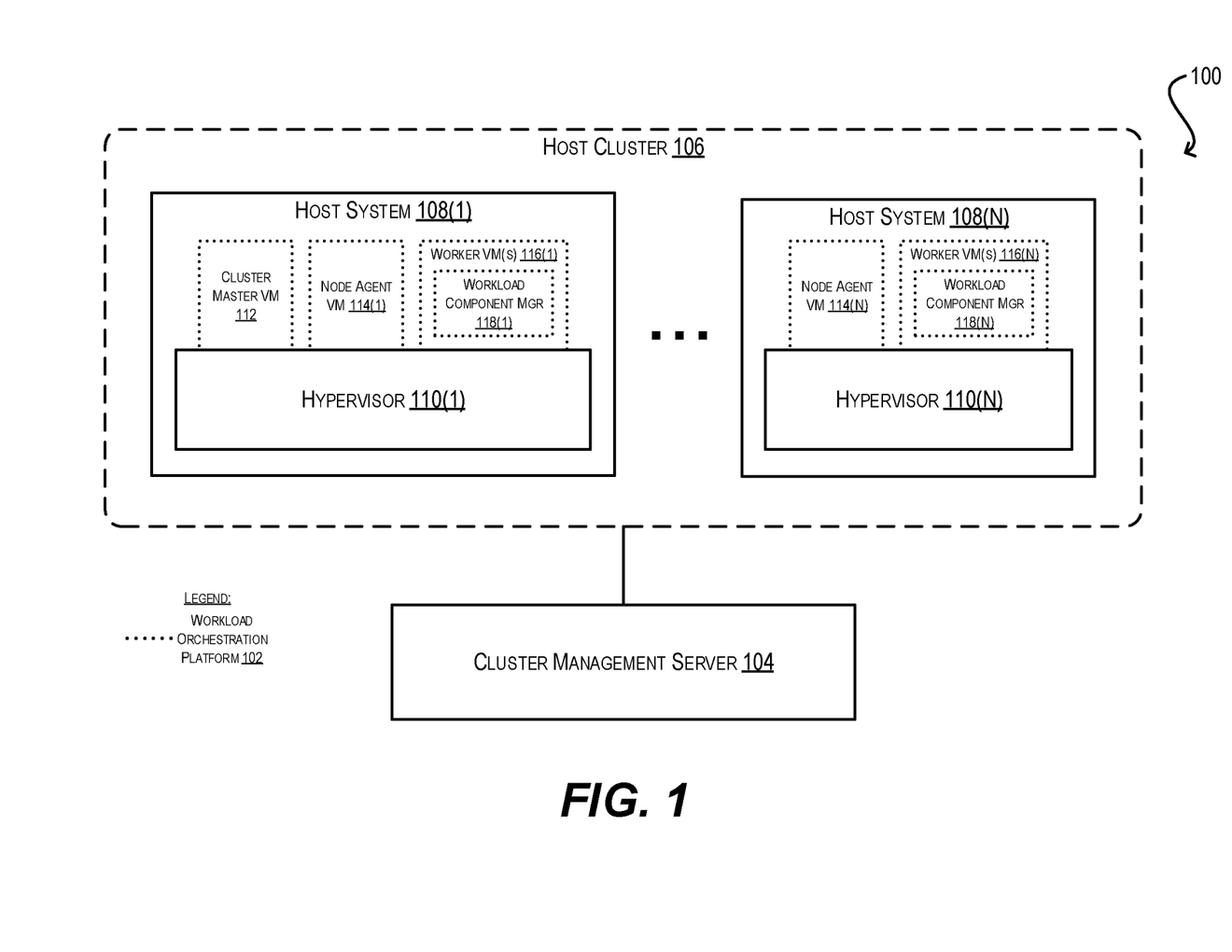
FIG. 1 depicts an example virtualized environment that implements a workload orchestration platform.

To provide context for the embodiments presented herein, FIG. 1 depicts an example virtualized environment 100 that implements a workload orchestration platform 102. Workload orchestration platform 102 may be, e.g., Kubernetes or any other functionally similar platform known in the art. As shown, virtualized environment 100 includes a cluster management server 104 and a host cluster 106 comprising a number of physical servers (i.e., host systems) 108(1)-(N). Cluster management server 104 is generally responsible for provisioning, configuring, and monitoring the entities in host cluster 106.

Each host system 108 includes, in software, a virtualization software layer (i.e., hypervisor) 110 and virtual machines that correspond to the control plane elements and computing nodes of workload orchestration platform 102. For example, host system 108(1) includes a cluster master VM 112 that can be understood as the front-end control plane element of workload orchestration platform 102 and is configured to expose, to external end-users such as application developers, an interface for deploying and running workloads on virtualized environment 100 via platform 102.

In addition, each host system 108 includes a control plane element referred to as a node agent VM (reference numeral 114) and one or more worker VMs 116 (each running a workload component manager 118). Generally speaking, at the time an end-user submits a workload for deployment to cluster master VM 112, cluster master VM 112 transmits, to the node agent VM of each host system designated to run an execution group of the workload, a specification of that execution group. This execution group specification identifies, among other things, the workload component(s) which are part of the execution group and the name and storage location of the software image needed to run each workload component. In response, the receiving node agent VM retrieves the software image(s) for the workload component(s) identified in the specification, stages the software image(s) on virtual disk(s), and attaches the virtual disk(s) to a newly created and powered-on worker VM. The workload component manager of the worker VM then begins execution of the workload component(s) within the worker VM using the attached virtual disk(s), thereby completing the workload deployment process. While the workload component(s) are running, the node agent VM may periodically monitor the state of the workload component(s) by querying the worker VM's workload component manager and report that state back to cluster manager VM 112.

As noted in the Background section, one problem with implementing a workload orchestration platform in a virtualized environment as depicted in FIG. 1 is that hypervisors 110(1)-(N) typically operate in a privileged mode (e.g., Ring 0 in the x86 microprocessor architecture) and therefore have access to the guest memories of their constituent VMs, which correspond to the control plane elements and computing nodes of workload orchestration platform 102 (i.e., cluster master VM 112, node agent VMs 114(1)-(N), and worker VMs 116(1)-(N)). This means a malicious entity that exploits a vulnerability in these hypervisors (or a rogue administrator with legitimate hypervisor access) could potentially tamper with workloads deployed via platform 102 and/or snoop or leak confidential data used by the workloads.

Figure 2:
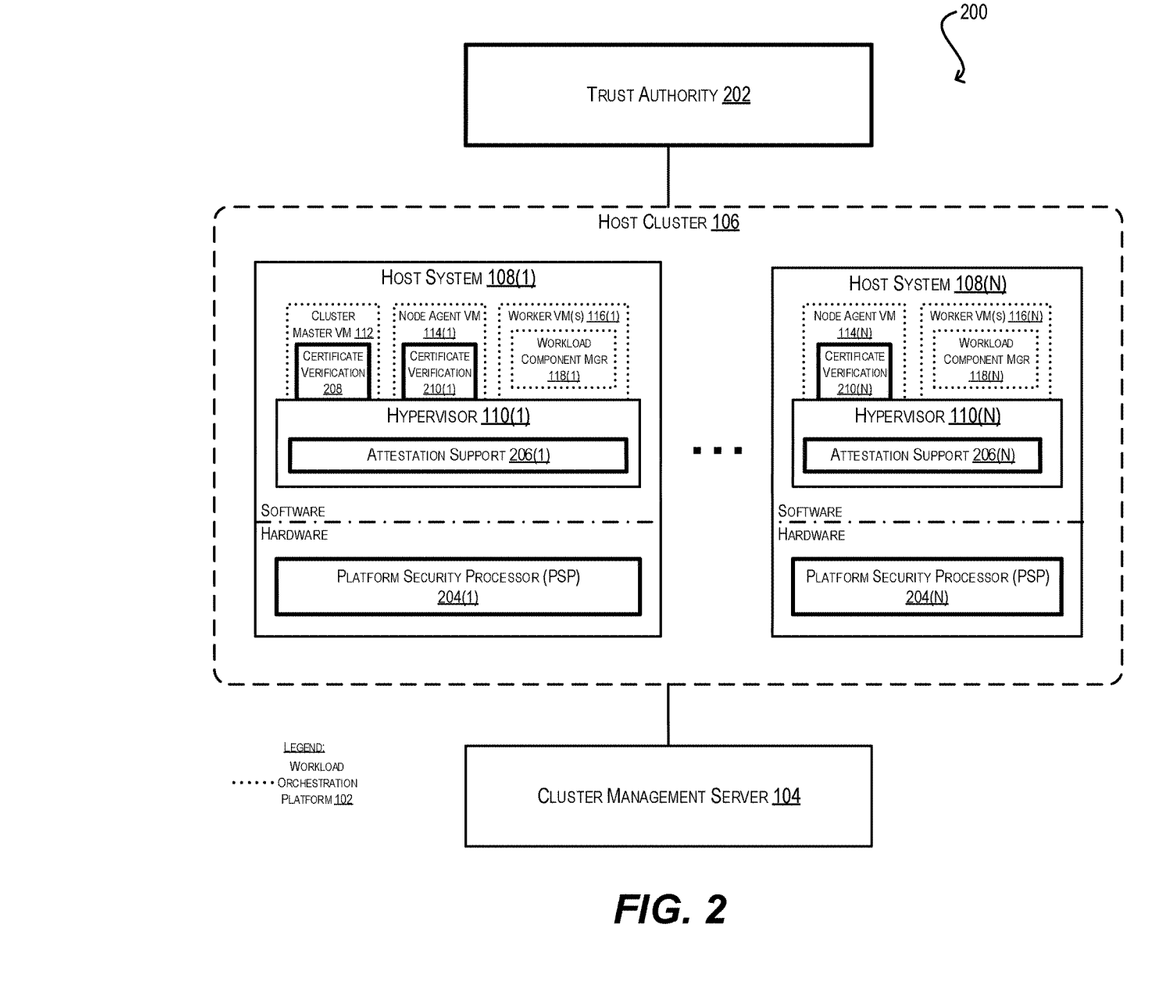
FIG. 2 depicts a modified version of the virtualized environment of FIG. 1 according to certain embodiments.

To address the foregoing and other similar concerns, FIG. 2 depicts a modified version of virtualized environment 100 of FIG. 1 (i.e., virtualized environment 200) according to certain embodiments of the present disclosure. As shown in FIG. 2, virtualized environment 200 includes a trust authority 202 that is communicatively coupled with host cluster 106. It is assumed that trust authority 202 cannot be compromised and maintains measurements (e.g., hashes) of the correct/valid VM images used for instantiating cluster master VM 112, each node agent VM 114, and each worker VM 116. In a particular embodiment, trust authority 202 may run on one or more machines that are separate from host cluster 106 and is secured, via physical and software security mechanisms, against potential attacks.

Virtualized environment 200 also includes, in the hardware of each host system 108, a platform security processor (PSP) 204 that supports hardware-based attestation of the VMs running on that host system. Hardware-based attestation is a process whereby an external trusted entity such as trust authority 202 can securely "attest" (i.e., validate) that the VM image used for instantiating a given VM is correct/authentic and can provide an indication of this validation, in addition to potentially other information, to PSP 204. In response PSP 204 can intercept, throughout the VM's runtime, accesses made by the VM to guest memory and encrypt/decrypt the accessed data using a VM-specific key that is local to the PSP and inaccessible by the host system's central processing unit(s) (CPU(s)). In this way, PSP 204 can keep the contents of the VM's guest memory hidden from the hypervisor, which is untrusted and thus potentially malicious. In certain embodiments, PSP 204 may implement one or more known VM encryption technologies (e.g., AMD SEV, Intel TDX, etc.) or variants thereof in order to carry out some or all of this processing.

Yet further, virtualized environment 200 includes an attestation support logic component 206 in each hypervisor 110 and certificate verification logic components 208 and 210 (1)-(N) in cluster master VM 112 and node agent VMs 114(1)-(N) respectively.

Taken together, components 202-210 enable workload orchestration platform 102 to secure the end-to-end deployment of workloads in virtualized environment 200 against compromised/rogue hypervisors and allow end-users to easily verify the same. For example, at the time of instantiating/powering-on the control plane elements of workload orchestration platform 102 (i.e., cluster master VM 112 and node agent VMs 114(1)-(N)), trust authority 202 can communicate with the PSPs of the host systems running these control plane elements and carry out (with the assistance of hypervisor-level attestation support logic 206) hardware-based attestation to validate that the control plane elements are authentic and to isolate their guest memories from their respective hypervisors. Upon successfully completing this, trust authority 202 can securely transmit a digital certificate (such as, e.g., a Transport Layer Security (TLS) certificate) to each control plane element that is signed using a private key of trust authority 202 and provides cryptographic proof that the control plane element has been successfully attested by trust authority 202.

Then, at the time an end-user wishes to submit a new workload to cluster master VM 112 for deployment in virtualized environment 200, the end-user can first verify cluster master VM 112's digital certificate using the published public key/root certificate of trust authority 202. Assuming the certificate verification of cluster master VM 112 is successful, the end-user can submit a specification of the workload and cluster master VM 112 can subsequently verify (via its certificate verification logic 208) the digital certificate of each node agent VM 114 whose host system is designated to run an execution group of the workload.

Assuming the certificate verifications of these node agent VMs are successful, trust authority 202 can carry out hardware-based attestation with respect to each worker VM 116 that is created for the purpose of running the workload components of the workload and can securely transmit a digital certificate to the worker VM upon attestation completion. The node agent VM associated with each worker VM can thereafter verify, via its certificate verification logic 210, the worker VM's digital certificate. Finally, assuming the certificate verifications of the worker VMs are successful, the node agent VMs can securely provide any runtime information needed by the worker VMs to their respective workload component managers (e.g., hashes of workload component image disks, etc.) and the workload component managers can proceed with running the workload components, with guest memory encryption enabled in accordance with the attestation process completed for each worker VM.

Notably, the foregoing steps establish a chain of trust between cluster master VM 112, node agent VMs 114(1)-(N), and worker VMs 116(1)-(N) that is rooted in trust authority 202. In particular, because cluster master VM 112 verifies the digital certificate of each node agent VM 114 and each node agent VM 114 verifies the digital certificate of each worker VM 116 at the time of workload deployment, as long as cluster master VM 112 is verified to be correct/authentic, node agent VMs 114(1)-(N) and worker VMs 116(1)-(N) are also guaranteed to be correct/authentic if the deployment completes successfully. This, in turn, means that end-users do not need to verify the authenticity of each of these platform components in order to be assured that the end-to-end deployment process is secure; instead, they only need to verify that the digital certificate of cluster master VM 112 is valid (i.e., was assigned by trust authority 202).

The remaining sections of this disclosure describe in greater detail the attestation and workload deployment workflows summarized above, as well as an enhancement that enables workload components running within worker VMs 116(1)-(N) to access confidential data in a secure manner (i.e., in a manner that keeps the confidential data hidden from the worker VMs' hypervisors). It should be appreciated that the architecture shown in FIG. 2 is illustrative and not intended to limit embodiments of the present disclosure. For example, although FIG. 2 depicts a particular arrangement of entities and components within virtualized environment 200, other arrangements are possible (e.g., the functionality attributed to a particular entity/component may be split into multiple entities/components, entities/components may be combined, etc.). Further, the various entities/components shown may include sub-components and/or functions that are not specifically described. One of ordinary skill in the art will recognize other variations, modifications, and alternatives.

3. Attestation of Cluster Master VM

Figure 3:
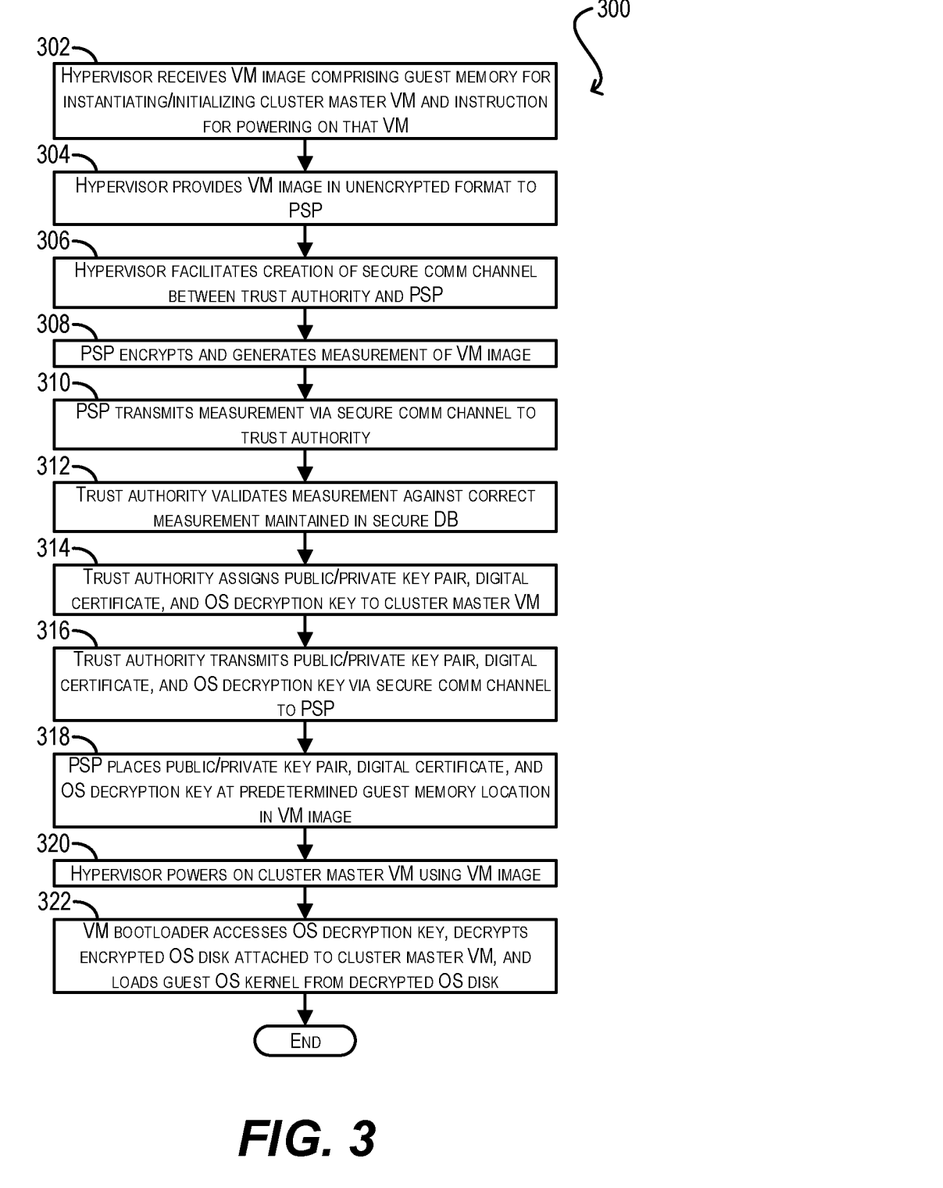
FIG. 3 depicts a workflow for attesting a cluster master VM according to certain embodiments.

FIG. 3 depicts a workflow 300 that can be executed in virtualized environment 200 of FIG. 2 for performing hardware-based attestation of cluster master VM 112 and assigning a digital certificate to cluster master VM 112 in accordance with certain embodiments. This workflow can be performed at the time cluster master VM 112 is initially provisioned and instantiated on its corresponding host system 108(1), which will typically occur during cluster creation. Workflow 300 assumes that, due to size constraints, the VM image used to instantiate cluster master VM 112 comprises a simple bootloader which subsequently loads the VM's guest OS kernel and application code from a separate OS disk after VM power-on. In embodiments where the guest OS kernel/application code fits within the VM image, the steps noted in workflow 300 pertaining to this separate OS disk can be omitted.

Starting with block 302, hypervisor 110(1) of host system 108(1) can receive (from, e.g., cluster management server 104) a VM image comprising the in-memory content (i.e., guest memory pages) needed to instantiate/initialize cluster master VM 112 and an instruction to power-on the VM. As noted above, in certain embodiments this VM image can include a simple bootloader rather than the entirety of the cluster master VM's guest OS kernel and application code.

At block 304, hypervisor 110(1) can provide, via its attestation support logic 206(1), the VM image in an unencrypted format to PSP 204(1). Attestation support logic 206(1) can also facilitate the creation of a secure communication channel between trust authority 202 and PSP 204(1) in order to carry out hardware-based attestation of the VM (block 306). In one set of embodiments, trust authority 202 and PSP 204(1) can employ a Diffie Hellman key exchange to establish this secure communication channel so that hypervisor 110(1) cannot eavesdrop on it.

At block 308, PSP 204(1) can encrypt and generate a measurement (e.g., hash) of the VM image (or more specifically, of the guest memory pages in the VM image). PSP 204(1) then transmit the measurement over the secure communication channel established at block 306 to trust authority 202 (block 310).

In response, trust authority 202 can validate the received measurement by comparing it to a known correct measurement for cluster master VM 112 maintained in a secure database of the trust authority (block 312). Upon determining that the received measurement matches the known correct measurement (which means that attestation of cluster master VM 112 is successful), trust authority 202 can assign a public/private key pair and a digital certificate to cluster master VM 112 (block 314) and transmit the public/private key pair, digital certificate, and an OS decryption key to PSP 204(1) over the secure communication channel (block 316). This digital certificate, which may be a TLS certificate or any other similar cryptographic certificate known in the art, can include the public key assigned to cluster master VM 112 and can be signed using a private key of a root certificate owned by trust authority 202, thereby providing cryptographic proof that trust authority 202 has successfully attested cluster master VM 112.

At blocks 318 and 320, PSP 204(1) can place the public/private key pair, digital certificate, and OS decryption key at a predetermined guest memory location in the VM image and hypervisor 110(1) can power on cluster master VM 112 using the VM image. Finally at block 322, the bootloader of cluster master VM 112 can access the OS decryption key, use it to decrypt an encrypted OS disk attached to the VM, and load the VM's guest OS kernel from the decrypted OS disk, which enables cluster master VM 112 to complete its boot up process and begin its runtime operation. Although not shown in workflow 300, any guest memory accesses made by cluster master VM 112 during its runtime operation will be intercepted and encrypted/decrypted by PSP 204(1)

in accordance with the PSP's VM encryption technology, thereby isolating cluster master VM 112's guest memory from hypervisor 110(1).

4. Attestation of Node Agent VMs

Figure 4:
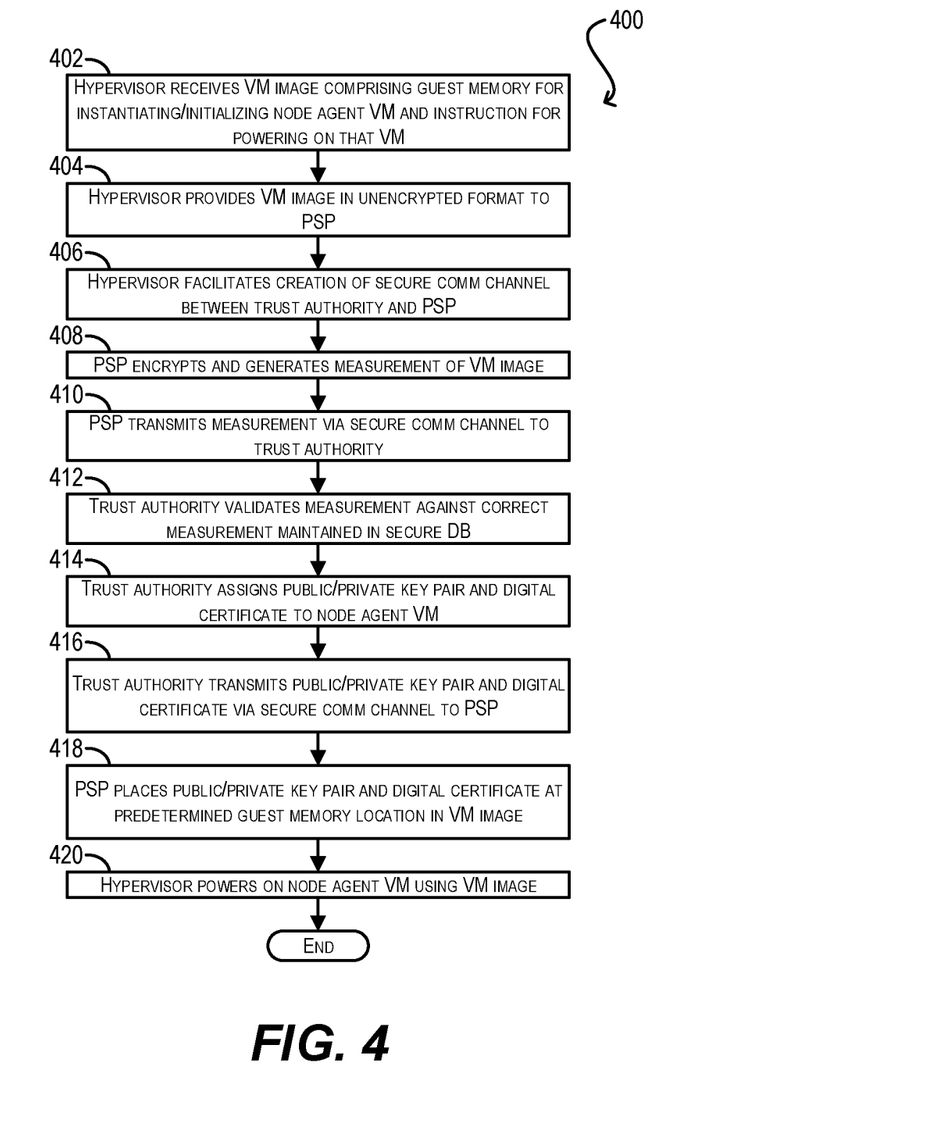
FIG. 4 depicts a workflow for attesting a node agent VM according to certain embodiments.

FIG. 4 depicts a workflow 400 that can be executed in virtualized environment 200 of FIG. 2 for performing hardware-based attestation of each node agent VM 114 and assigning a digital certificate to VM 114 in accordance with certain embodiments. The steps of workflow 400 are largely similar to workflow 300 but do not involve a separate OS disk (as it is assumed that the node agent VM's guest OS kernel and application code is fairly small in size and thus can fit within its VM image). Like the attestation of cluster master VM 112, the attestation of each node agent VM 114 can be performed at the time the node agent VM is initially provisioned and instantiated during cluster creation.

Starting with block 402, hypervisor 110 of each host system 108 can receive (from, e.g., cluster management server 104) a VM image comprising the guest memory content needed to instantiate/initialize its node agent VM 114 and an instruction to power-on the VM. This guest memory content can include the guest OS kernel and application code for the node agent VM.

At block 404, hypervisor 110 can provide, via its attestation support logic 206, the VM image in an unencrypted format to PSP 204 (block 404). Attestation support logic 206 can also facilitate the creation of a secure communication channel between trust authority 202 and PSP 204 in order to carry out hardware-based attestation of node agent VM 114 (block 406).

At block 408, PSP 204 can encrypt and generate a measurement of the VM image (or more specifically, of the guest memory pages in the VM image). PSP 204 then transmit the measurement over the secure communication channel established at block 406 to trust authority 202 (block 410).

In response, trust authority 202 can validate the received measurement by comparing it to a known correct measurement for node agent VM 114 maintained in a secure database of the trust authority (block 412). Upon determining that the received measurement matches the known correct measurement (which means that attestation of node agent VM 114 is successful), trust authority 202 can assign a public/private key pair and a digital certificate to node agent VM 114 (block 414) and transmit these items to PSP 204 over the secure communication channel (block 416). This digital certificate can include the public key assigned to node agent VM 114 and can be signed using a private key of the root certificate owned by trust authority 202, thereby providing cryptographic proof that trust authority 202 has successfully attested node agent VM 114.

At blocks 418 and 420, PSP 204 can place the public/private key pair and digital certificate at a predetermined guest memory location in the VM image and hypervisor 110 can power on node agent VM 114 using the VM image. As with cluster master VM 112, any guest memory accesses made by node agent VM 114 during its runtime operation will be intercepted and encrypted/decrypted by PSP 204 in accordance with the PSP's VM encryption technology, thereby isolating node agent VM 114's guest memory from hypervisor 110.

5. Workload Deployment

Figure 5A:
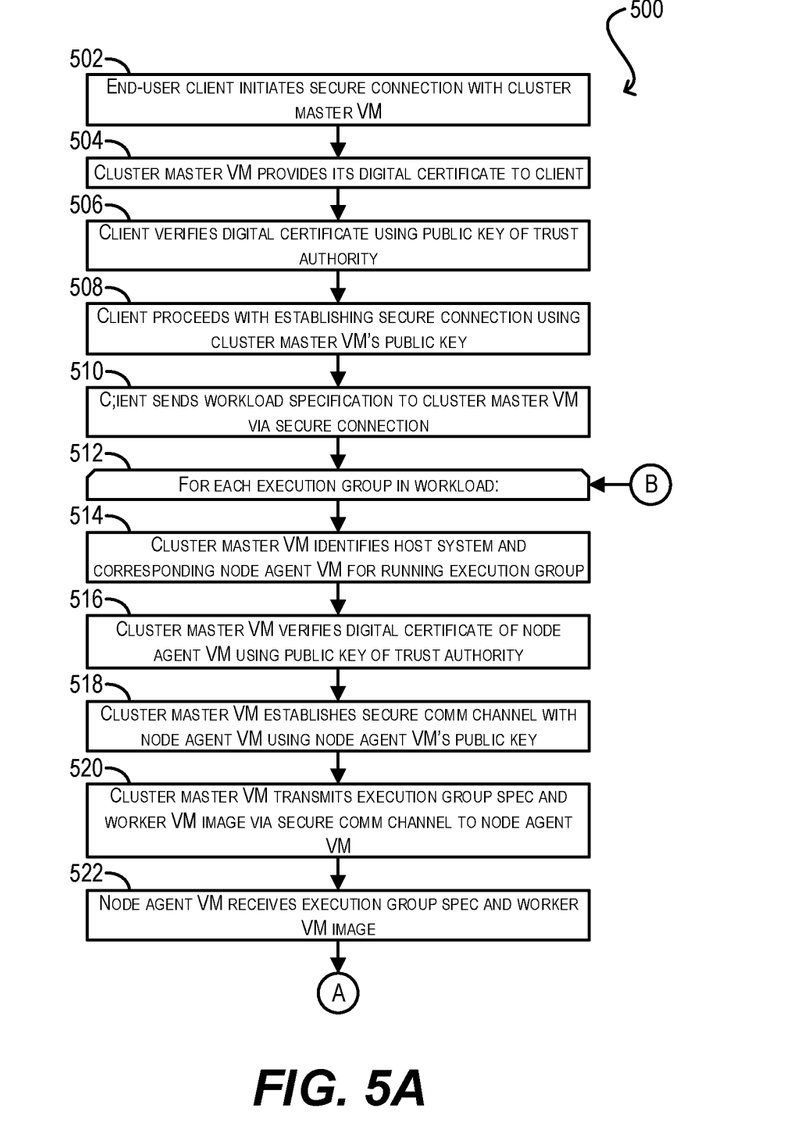
FIGS. 5A and 5B depict a workload deployment workflow according to certain embodiments.
Figure 5B:
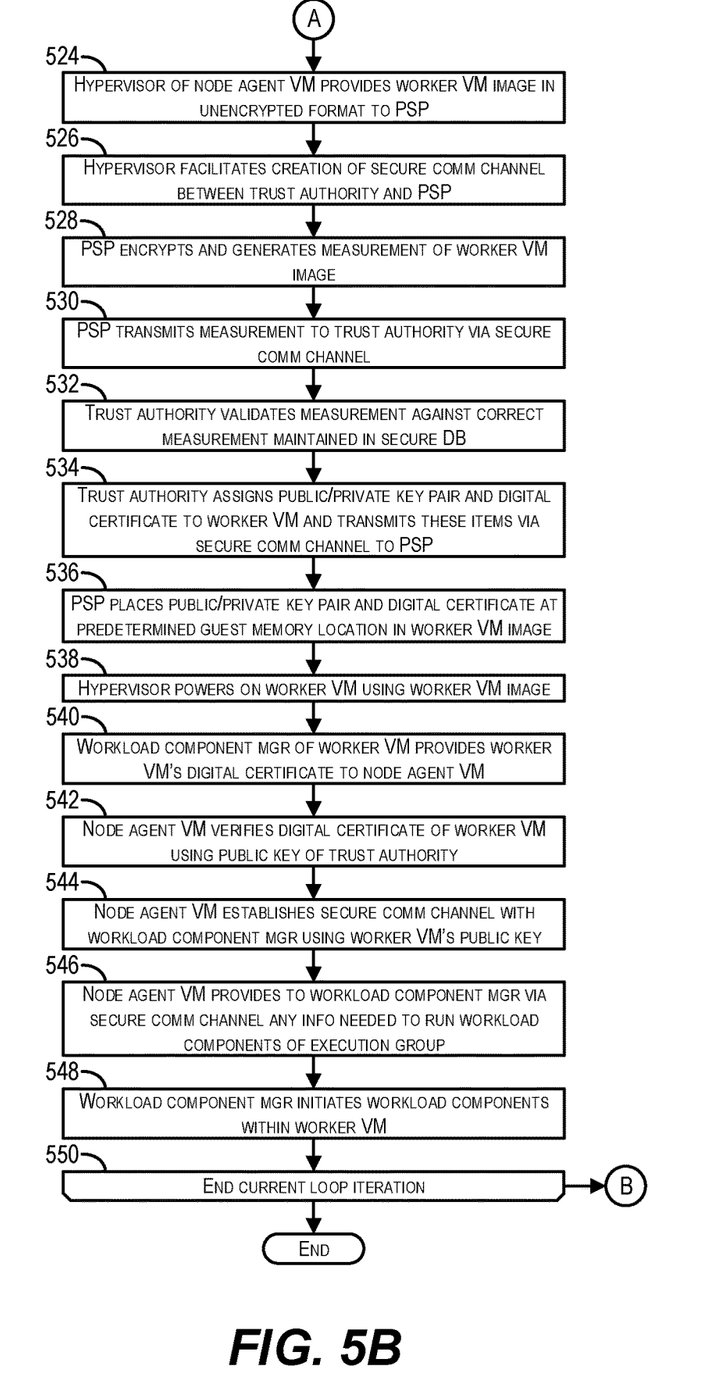

FIGS. 5A and 5B depict a workflow 500 that can be executed in virtualized environment 200 of FIG. 2 for deploying a workload via workload orchestration platform 102 according to certain embodiments. Workflow 500 assumes that cluster master VM 112 and node agent VMs 114(1)-(N) have been attested by trust authority 202 and each assigned a public/private key pair and digital certificate in accordance with workflows 300 and 400.

Starting with blocks 502 and 504 of FIG. 5A, the client of an end-user (e.g., application developer) can initiate a secure connection with cluster master VM 112 for deploying a workload in virtualized environment 200 and cluster master VM 112 can provide its digital certificate to the client.

At block 506, the client can verify cluster master VM 112's digital certificate by attempting to decrypt the digital signature included in the certificate using the published public key/root certificate of trust authority 202. Assuming the decryption of the digital signature is successful (which means that the digital certificate is valid and thus provides proof that cluster master VM 112 has been successfully attested by trust authority 202), the client can proceed with establishing the secure connection using cluster master VM's 112 public key (block 508) and transmit a workload specification to cluster master VM 112 over the secure connection (block 510). This workload specification can include a list of the execution groups that are part of the workload and a specification for each execution group which identifies a list of one or more workload components and corresponding software images.

At block 512, cluster master VM 112 can receive the workload specification and enter a loop for each execution group identified therein. Within this loop, cluster master VM 112 can identify (in conjunction with, e.g., a scheduler component of cluster management server 104) a particular host system 108(X) and corresponding node agent VM 114(X) for running the execution group (block 514). Cluster master VM 112 can then verify the digital certificate of node agent VM 114(X) by attempting to decrypt the digital signature included in that certificate using the published public key/root certificate of trust authority 202 (block 516).

Assuming this decryption is successful (which means that the digital certificate is valid and thus provides proof that node agent VM 114(X) has been successfully attested by trust authority 202), cluster master VM 112 can establish a secure communication channel with node agent VM 114(X) using node agent VM 114(X)'s public key (block 518). Cluster master VM 112 can thereafter transmit the specification for the execution group and a worker VM image to node agent VM 114(X) over the secure communication channel (block 520). This worker VM image can comprise the guest memory content needed for instantiating/initializing each worker VM (e.g., the worker VM's guest OS kernel and application code for workload component manager 118).

In response, node agent VM 114(X) can receive the execution group specification and worker VM image (block 522) and, in conjunction with hypervisor 110(X), proceed with attesting and creating a new worker VM 116(X) on host system 108(X) for running the execution group. For example, turning now to FIG. 5B, at blocks 524 and 526 hypervisor 110(X) can provide the worker VM image in an unencrypted format to PSP 204(X) and facilitate the creation of a secure communication channel between trust authority 202 and PSP 204(X).

At block 528, PSP 204(X) can encrypt and generate a measurement of the worker VM image (or more specifically, of the guest memory pages in the worker VM image). PSP 204(X) can then transmit the measurement over the secure communication channel established at block 526 to trust authority 202 (block 530).

At block 532, trust authority 202 can validate the received measurement by comparing it to a known correct measurement for the worker VM image maintained in a secure database of the trust authority. Upon determining that the received measurement matches the known correct measurement (which means that the attestation of new worker VM 116(X) is successful), trust authority 202 can assign a public/private key pair and a digital certificate to worker VM 116(X) and transmit these items to PSP 204(X) over the secure communication channel (block 534). This digital certificate can include the public key assigned to worker VM 116(X) and can be signed using a private key of the root certificate owned by trust authority 202, thereby providing cryptographic proof that trust authority 202 has successfully attested worker VM 116(X).

At blocks 536 and 538, PSP 204(X) can place the public/private key pair and digital certificate at a predetermined guest memory location in the worker VM image and hypervisor 110(X) can power on worker VM 116(X) using the image. As with the cluster master VM and node agent VMs, any guest memory accesses made by worker VM 116(X) during its runtime operation will be intercepted and encrypted/decrypted by PSP 204(X) in accordance with the PSP's VM encryption technology, thereby isolating worker VM 116(X)'s guest memory from hypervisor 110(X).

Then, once worker VM 112(X) has completed its boot up process, its workload component manager 118(X) can provide the worker VM's digital certificate to node agent VM 114(X) (block 540). In response, node agent VM 114(X) can verify the digital certificate by attempting to decrypt the digital signature included in the certificate using the published public key/root certificate of trust authority 202 (block 542).

Assuming this decryption is successful (which means that the digital certificate is valid and thus provides proof that worker VM 116(X) has been securely attested by trust authority 202), node agent VM 114(X) can establish a secure communication channel with workload component manager 118(X) using worker VM 116(X)'s public key (block 544). Node agent VM 114(X) can subsequently provide, to workload component manager 118(X) over the secure communication channel, any information needed by manager 118(X) in order to run the workload components of the execution group (block 546). This information can include, e.g., integrity hashes for the software images of the workload components data decryption keys (discussed in section (6) below).

Finally, workload component manager 118(X) can initiate the workload components within worker VM 116(X) (block 548), the end of the current loop iteration can be reached (block 550), and workflow 500 can return to block 512 of FIG. 5A in order to process the next execution group in the workload specification. Once all of the execution groups of the workload have been processed, workflow 500 can end.

It should be appreciated that workflow 500 is illustrative and various modifications are possible. For example, although workflow 500 indicates that the deployment of each execution group of the workload is performed serially via the loop starting at block 512, in alternative embodiments the execution groups can be deployed in parallel to their corresponding host systems/node agent VMs.

Further, although workflow 500 indicates that cluster master VM 112 verifies the digital certificate of each node agent VM 114 at the time of providing an execution group specification to that node agent VM, in alternative embodiments cluster master VM 112 can pre-verify node agent VMs 114(1)-(N), such as at the time of their creation. In these embodiments, upon verifying the digital certificate of a given node agent VM 114, cluster master VM 112 can register that node agent VM as being an authentic platform component. This avoids the need for cluster master VM 112 to re-verify each node agent VM during workload deployment; instead, cluster master VM 112 can simply check whether it has been previously registered.

6. Allowing Workload Components Secure Access to Confidential Data

In some scenarios, the workload components running within worker VMs 116(1)-(N) of virtualized environment 200 may require access to confidential data (i.e., data that is private to the workload owner/submitter) as part of their processing. Examples of such confidential data include employee records, financial information, and so on. It is important that such confidential data is kept hidden from hypervisors 110(1)-(N) because the hypervisors may become compromised as mentioned previously and thus may potentially snoop or leak the data.

Figure 6:
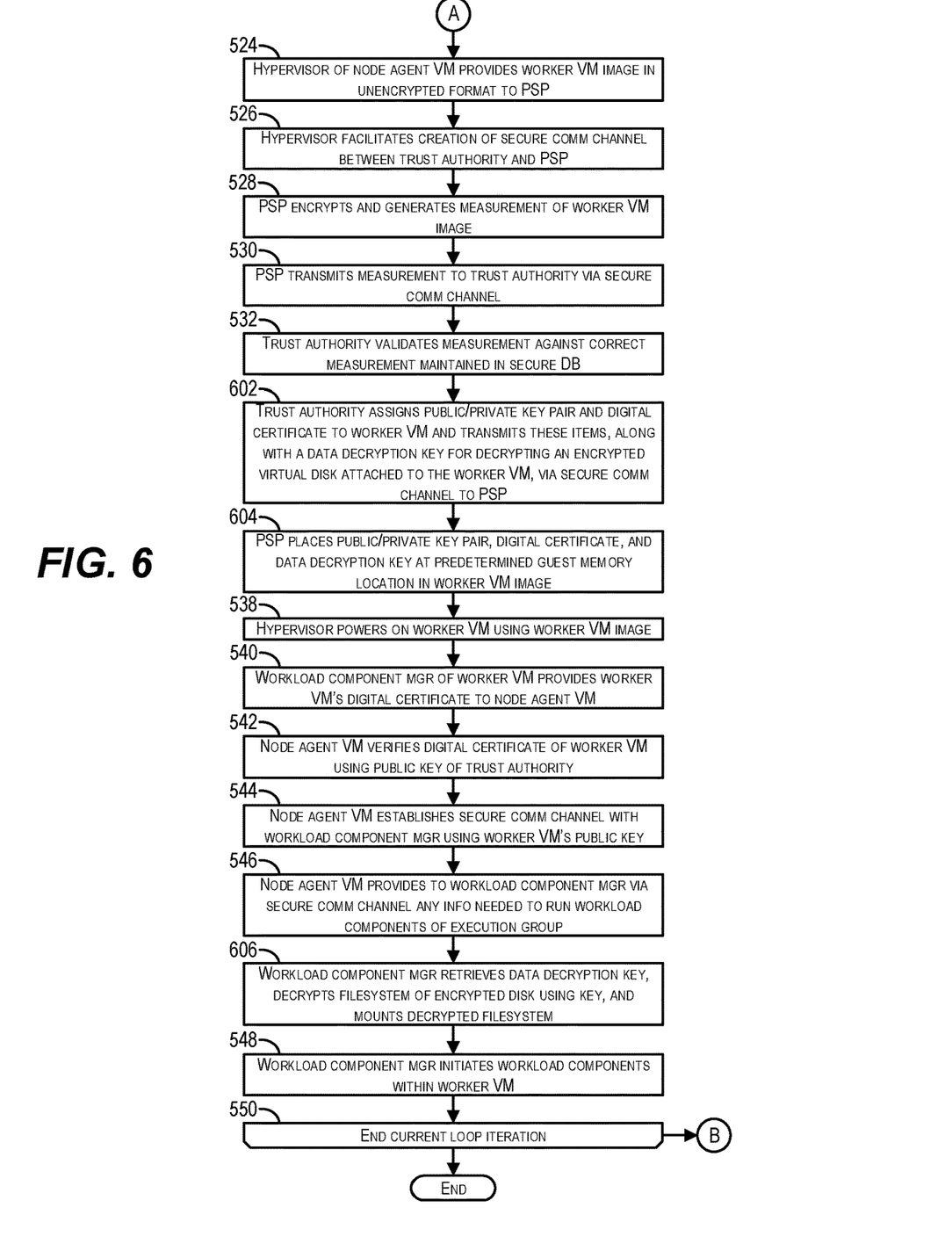
FIG. 6 depicts a first modified version of FIG. 5B that enables workload components to securely access confidential data according to certain embodiments.
Figure 7:
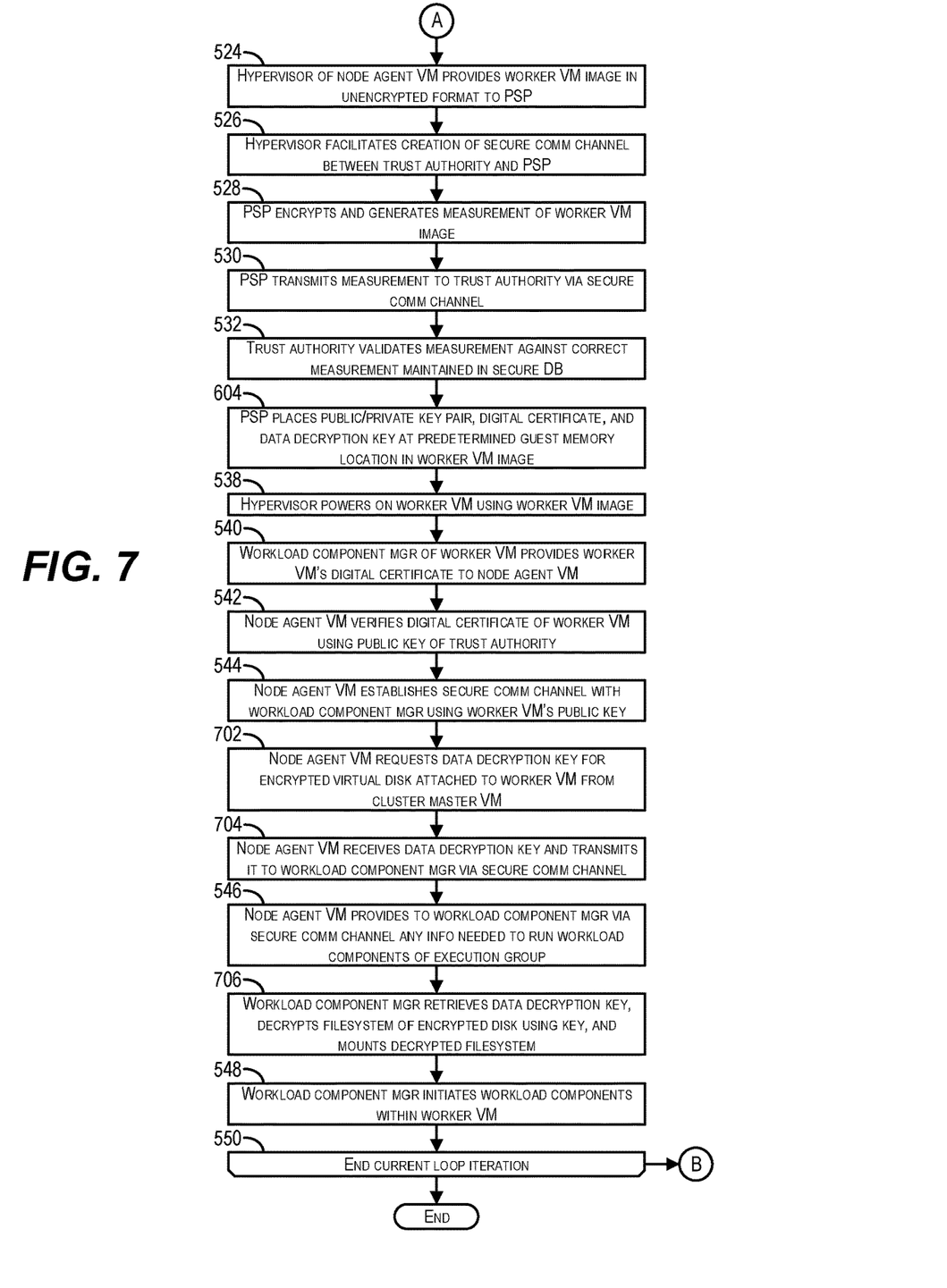
FIG. 7 depicts a second modified version of FIG. 5B that enables workload components to securely access confidential data according to certain embodiments.

To allow workload components secure access to their confidential data, FIGS. 6 and 7 depict two alternative implementations of the execution group deployment steps shown in FIG. 5B. In both of these implementations, it is assumed that the confidential data needed by the workload components of a given worker VM 116(X) is placed by its corresponding node agent VM 114(X) on an encrypted virtual disk and this encrypted virtual disk is attached to worker VM 116(X). Then, with the implementation of FIG. 6, trust authority 202 can transmit a data decryption key for the encrypted virtual disk to PSP 204(X) at the time of attesting worker VM 116(X) and PSP 204(X) can securely provide the data decryption key to workload component manager 118(X) of worker VM 116(X). Workload component manager 118(X) can subsequently use the data decryption key to decrypt the encrypted virtual disk and thereby make the confidential data stored therein available to the workload components running within worker VM 116(X).

Alternatively, with the implementation of FIG. 7, cluster master VM 112 can maintain the data decryption key for the encrypted virtual disk of worker VM 116(X) and can securely transmit this key to node agent VM 114(X) once node agent VM 114(X) has verified the digital certificate of worker VM 116(X). Node agent VM 114(X) can then securely provide the data decryption key to workload component manager 118(X) for decrypting the encrypted virtual disk.

With either of these implementations, hypervisor 110(X) cannot access the data decryption key because it is transmitted via secure channels to workload component manager 118(X) (and because the guest memory of worker VM 116(X) is isolated from hypervisor 110(X) per the operation of PSP 204(X)). Further, the workload components running within worker VM 116(X) do not need to be modified to decrypt the encrypted virtual disk because the decryption process is handled transparently by workload component manager 118(X).

Turning now to FIG. 6, the steps shown here are identical to FIG. 5B except for blocks 602, 604, and 606. At block 602 (which replaces block 534 of FIG. 5B), trust authority 202 can transmit to PSP 204(X) a data decryption key for the encrypted virtual disk attached to worker VM 116(X) (in addition to transmitting the public/private key pair and digital certificate assigned to worker VM 116(X)). At block 604 (which replaces block 536 of FIG. 5B), PSP 204(X) can place the data decryption key at a predetermined guest memory location in the worker VM image.

Then, at block 606 (which follows block 546 of FIG. 5B), workload component manager 118(X) can retrieve the data decryption key from the predetermined guest memory location, decrypt the filesystem of the encrypted virtual disk using that key, and mount the filesystem in unencrypted form for use by the workload components of worker VM 116(X). Alternatively, if the guest OS kernel of workload VM 116(X) supports encrypted filesystems, workload component manager 118(X) can mount the filesystem in encrypted form and provide the data decryption key to the guest OS kernel so that the guest OS kernel can perform the decryption.

With respect to FIG. 7, the steps shown here are identical to FIG. 5B except for blocks 702, 704, and 706. At block 702 (which follows block 544 of FIG. 5B), node agent 114(X) can request the data decryption key for worker VM 116(X)'s encrypted virtual disk from cluster master VM 112. Cluster master VM 112 may maintain this decryption key in, e.g., its OS disk or some other storage location.

At blocks 704, node agent VM 114(X) can receive the data decryption key via the secure communication channel between cluster master VM 112 and node agent VM 114(X) and provide the decryption key to workload component manager 118(X) via the secure communication channel between node agent VM 114(X) and workload component manager 118(X). Finally, at block 706, workload component manager 118(X) can decrypt the filesystem of the encrypted virtual disk using the data decryption key and mount the filesystem in unencrypted form for use by the workload components of worker VM 116(X).

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
attaching, by a control plane element of a workload orchestration platform implemented in a virtualized environment, an encrypted virtual disk to a worker VM designated to execute a workload component of a workload, the encrypted virtual disk including data needed by the workload component for carrying out its processing;
receiving, by the control plane element from the worker VM, a digital certificate assigned to the worker VM by a trust authority, the digital certificate including a digital signature signed by the trust authority and indicating that the trust authority has successfully validated the worker VM using hardware-based attestation; and
verifying, by the control plane element, the digital certificate using a public key of the trust authority, wherein once the digital certificate verified, the worker VM retrieves a data decryption key and uses the data decryption key to decrypt the encrypted virtual disk.

2. The method of claim 1 wherein the data decryption key is provided by the control plane element to the worker VM upon verifying the digital certificate.

3. The method of claim 1 wherein the trust authority validates the worker VM using hardware-based attestation by:
receiving, from a hardware security processor of a host system on which the worker VM is designated to run, a measurement of a VM image used for instantiating the worker VM on the host system; and determining whether the measurement matches a known correct measurement of the VM image maintained by the trust authority.

4. The method of claim 3 wherein, upon determining that the measurement matches the known correct measurement, the trust authority:
signs the digital certificate using a private key of the trust authority, thereby creating the digital signature; and
transmits the digital certificate and the data decryption key to the hardware security processor.

5. The method of claim 4 wherein upon receiving the digital certificate and the data decryption key from the trust authority, the hardware security processor places the digital certificate and data decryption key in a known memory location within the VM image.

6. The method of claim 5 wherein the worker VM retrieves the data decryption key from the known memory location in order to decrypt the encrypted virtual disk.

7. The method of claim 1 wherein the data included in the encrypted virtual disk is confidential data that is private to a entity that submitted the workload.

8. A non-transitory computer readable storage medium having stored thereon program code executable by a control plane element of a workload orchestration platform implemented in a virtualized environment, the program code causing the control plane element to execute a method comprising:
attaching an encrypted virtual disk to a worker VM designated to execute a workload component of a workload, the encrypted virtual disk including data needed by the workload component for carrying out its processing;
receiving, from the worker VM, a digital certificate assigned to the worker VM by a trust authority, the digital certificate including a digital signature signed by the trust authority and indicating that the trust authority has successfully validated the worker VM using hardware-based attestation; and
verifying the digital certificate using a public key of the trust authority, wherein once the digital certificate verified, the worker VM retrieves a data decryption key and uses the data decryption key to decrypt the encrypted virtual disk.

9. The non-transitory computer readable storage medium of claim 8 wherein the data decryption key is provided by the control plane element to the worker VM upon verifying the digital certificate.

10. The non-transitory computer readable storage medium of claim 8 wherein the trust authority validates the worker VM using hardware-based attestation by:
receiving, from a hardware security processor of a host system on which the worker VM is designated to run, a measurement of a VM image used for instantiating the worker VM on the host system; and
determining whether the measurement matches a known correct measurement of the VM image maintained by the trust authority.

11. The non-transitory computer readable storage medium of claim 10 wherein, upon determining that the measurement matches the known correct measurement, the trust authority:
signs the digital certificate using a private key of the trust authority, thereby creating the digital signature; and
transmits the digital certificate and the data decryption key to the hardware security processor.

12. The non-transitory computer readable storage medium of claim 11 wherein upon receiving the digital certificate and the data decryption key from the trust authority, the hardware security processor places the digital certificate and data decryption key in a known memory location within the VM image.

13. The non-transitory computer readable storage medium of claim 12 wherein the worker VM retrieves the data decryption key from the known memory location in order to decrypt the encrypted virtual disk.

14. The non-transitory computer readable storage medium of claim 8 wherein the data included in the encrypted virtual disk is confidential data that is private to a entity that submitted the workload.

15. A host system executing a control plane element of a workload orchestration platform implemented in a virtualized environment, the host system comprising:
a processor; and
a non-transitory computer readable medium having stored thereon program code that, when executed, causes the processor to:
attach an encrypted virtual disk to a worker VM designated to execute a workload component of a workload, the encrypted virtual disk including data needed by the workload component for carrying out its processing;
receive, from the worker VM, a digital certificate assigned to the worker VM by a trust authority, the digital certificate including a digital signature signed by the trust authority and indicating that the trust authority has successfully validated the worker VM using hardware-based attestation; and
verify the digital certificate using a public key of the trust authority, wherein once the digital certificate verified, the worker VM retrieves a data decryption key and uses the data decryption key to decrypt the encrypted virtual disk.

16. The host system of claim 15 wherein the processor provides the data decryption key to the worker VM upon verifying the digital certificate.

17. The host system of claim 15 wherein the trust authority validates the worker VM using hardware-based attestation by:
receiving, from a hardware security processor of the host system, a measurement of a VM image used for instantiating the worker VM on the host system; and
determining whether the measurement matches a known correct measurement of the VM image maintained by the trust authority.

18. The host system of claim 17 wherein, upon determining that the measurement matches the known correct measurement, the trust authority:
signs the digital certificate using a private key of the trust authority, thereby creating the digital signature; and
transmits the digital certificate and the data decryption key to the hardware security processor.

19. The host system of claim 18 wherein upon receiving the digital certificate and the data decryption key from the trust authority, the hardware security processor places the digital certificate and data decryption key in a known memory location within the VM image.

20. The host system of claim 19 wherein the worker VM retrieves the data decryption key from the known memory location in order to decrypt the encrypted virtual disk.

21. The host system of claim 15 wherein the data included in the encrypted virtual disk is confidential data that is private to a entity that submitted the workload.

* * * * *